United States Patent
Tanabe et al.

(10) Patent No.: US 12,209,542 B2
(45) Date of Patent: Jan. 28, 2025

(54) GAS TURBINE SYSTEM AND CONTROL METHOD THEREFOR

(71) Applicant: MITSUBISHI HEAVY INDUSTRIES, LTD., Tokyo (JP)

(72) Inventors: Hiroshi Tanabe, Kanagawa (JP); Yasutsugu Takata, Kanagawa (JP); Kyosuke Kawano, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/273,435

(22) PCT Filed: Mar. 23, 2022

(86) PCT No.: PCT/JP2022/013350
§ 371 (c)(1),
(2) Date: Jul. 20, 2023

(87) PCT Pub. No.: WO2022/202862
PCT Pub. Date: Sep. 29, 2022

(65) Prior Publication Data
US 2024/0117772 A1  Apr. 11, 2024

(30) Foreign Application Priority Data
Mar. 26, 2021 (JP) ................. 2021-053782

(51) Int. Cl.
*F02C 9/28* (2006.01)
(52) U.S. Cl.
CPC .................... *F02C 9/28* (2013.01)
(58) Field of Classification Search
CPC ..................................................... F02C 9/28
See application file for complete search history.

(56) References Cited

U.S. PATENT DOCUMENTS

| 9,541,005 B2* | 1/2017 | Lamarre ............ F02C 9/20 |
| 2003/0056522 A1* | 3/2003 | Hartzheim ........ F02C 7/224 |
| | | 431/6 |

(Continued)

FOREIGN PATENT DOCUMENTS

| JP | 2006342712 A | * 12/2006 |
| JP | 2014-47728 | 3/2014 |

(Continued)

OTHER PUBLICATIONS

International Search Report issued Jun. 14, 2022 in corresponding International Application No. PCT/JP2022/013350.

(Continued)

*Primary Examiner* — David P. Olynick
(74) *Attorney, Agent, or Firm* — Wenderoth, Lind & Ponack, L.L.P.

(57) ABSTRACT

A gas turbine system and control method for the gas turbine system that includes: a gas turbine including a compressor for producing compressed air, a combustor for burning fuel with the compressed air, and a turbine driven by combustion gas generated by burning fuel in the combustor; a motor generator drivable by the turbine and capable of providing rotational power to the gas turbine by electric power supplied from outside the gas turbine; a fuel flow determination device for determining a set value of a parameter used to control a flow rate of the fuel supplied to the combustor; and a fuel flow control device for controlling the flow rate of the fuel supplied to the combustor, based on the set value. The fuel flow determination device determines the set value such that the flow rate of the fuel is a lower limit value in a reverse power operation mode.

7 Claims, 3 Drawing Sheets

(56) References Cited

U.S. PATENT DOCUMENTS

| | | | |
|---|---|---|---|
| 2004/0237538 A1* | 12/2004 | McKelvey | F02C 9/26 60/778 |
| 2006/0150633 A1 | 7/2006 | McGinley et al. | |
| 2014/0216047 A1 | 8/2014 | Morisaki et al. | |
| 2020/0173368 A1* | 6/2020 | Husband | F02C 9/00 |
| 2020/0400079 A1 | 12/2020 | Takahashi et al. | |

FOREIGN PATENT DOCUMENTS

| | | |
|---|---|---|
| JP | 2014-114707 | 6/2014 |
| JP | 2014-148933 | 8/2014 |
| JP | 2019-143563 | 8/2019 |

OTHER PUBLICATIONS

Translation of the International Preliminary Report on Patentability mailed on Oct. 5, 2023 in corresponding International Application No. PCT/JP2022/013350.

* cited by examiner

GAS TURBINE SYSTEM AND CONTROL METHOD THEREFOR

TECHNICAL FIELD

The present disclosure relates to a gas turbine system and a control method therefor.

This application claims the priority of Japanese Patent Application No. 2021-053782 filed on Mar. 26, 2021, the content of which is incorporated herein by reference.

BACKGROUND

For example, Patent Document 1 describes power generation by driving a generator with a gas turbine.

CITATION LIST

Patent Literature

Patent Document 1: JP2014-47728A

SUMMARY

Technical Problem

In a normal operation mode where a generator is driven by a gas turbine, the flow rate (fuel supply amount) of fuel supplied to a combustor of the gas turbine is generally controlled based on a rotation speed of the gas turbine, an output of the generator, a temperature of an exhaust gas of the gas turbine, etc. However, in a reverse power operation mode where rotational power is provided to the gas turbine by electric power supplied from outside the gas turbine, if the same control as the control in the normal operation mode is performed, it may not be possible to appropriately control fuel supply.

In view of the above, an object of at least one embodiment of the present disclosure is to provide a gas turbine system and a control method therefor that can appropriately control the flow rate of fuel supplied to the combustor of the gas turbine in the reverse power operation mode.

Solution to Problem

In order to achieve the above object, a gas turbine system according to the present disclosure, includes: a gas turbine which includes a compressor for producing compressed air, a combustor for burning fuel with the compressed air, and a turbine driven by a combustion gas generated by burning the fuel in the combustor; a motor generator drivable by the turbine and capable of providing rotational power to the gas turbine by electric power supplied from outside the gas turbine; a fuel flow determination device for determining a set value of a parameter used to control a flow rate of the fuel supplied to the combustor; and a fuel flow control device for controlling the flow rate of the fuel supplied to the combustor, based on the set value. The fuel flow determination device determines the set value such that the flow rate of the fuel is a lower limit value in a reverse power operation mode, in the reverse power operation mode which is an operation mode where the motor generator provides the rotational power to the gas turbine.

Further, a control method for a gas turbine system according to the present disclosure is a control method for a gas turbine system that includes: a gas turbine which includes a compressor for producing compressed air, a combustor for burning fuel with the compressed air, and a turbine driven by a combustion gas generated by burning the fuel in the combustor; a motor generator drivable by the turbine and capable of providing rotational power to the gas turbine by electric power supplied from outside the gas turbine; and a fuel flow control device for controlling a set value of a parameter used to control a flow rate of the fuel supplied to the combustor, the control method for the gas turbine system, including: determining the set value such that the flow rate of the fuel is not less than a lower limit value in a reverse power operation mode, in the reverse power operation mode which is an operation mode where the motor generator provides the rotational power to the gas turbine.

Advantageous Effects

According to a gas turbine system and a control method therefor of the present disclosure, it is possible to appropriately control the flow rate of fuel supplied to a combustor of a gas turbine in a reverse power operation mode.

DETAILED DESCRIPTION

Hereinafter, a gas turbine system and a control method therefor according to the embodiments of the present disclosure will be described with reference to the drawings. The embodiment to be described below indicates one aspect of the present disclosure, does not intend to limit the disclosure, and can optionally be modified within a range of a technical idea of the present disclosure.

<Configuration of Gas Turbine System According to Embodiment of Present Disclosure>

Figure 1:
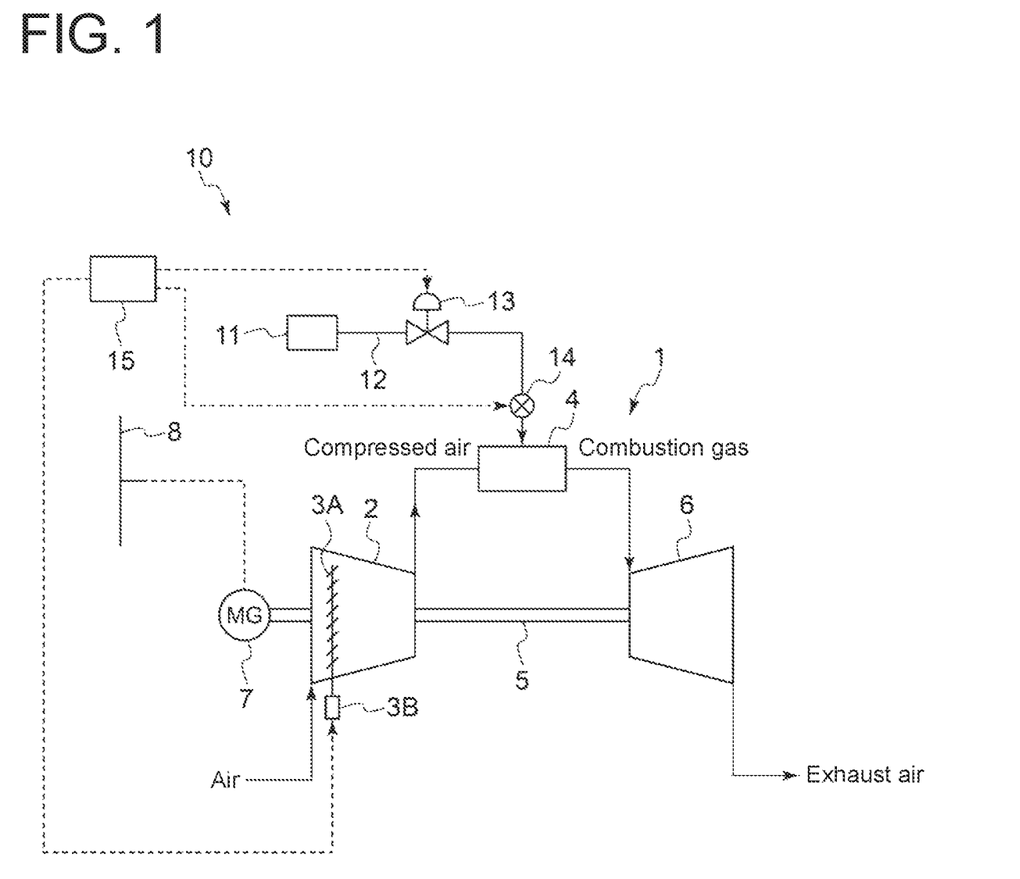
FIG. 1 is a configuration diagram of a gas turbine system according to an embodiment of the present disclosure.

As shown in FIG. 1, a gas turbine system 10 according to an embodiment of the present disclosure includes a gas turbine 1 that includes a combustor 4 for burning fuel to generate a combustion gas, a compressor 2 for supplying compressed air serving as combustion air to the combustor 4, and a turbine 6 which shares a common rotational shaft 5 with the compressor 2 and is configured to be driven by the combustion gas generated by the combustor 4. The rotational shaft 5 is connected to a motor generator 7, and the motor generator 7 is configured to be electrically connectable to a power system 8 outside the gas turbine 1. An inlet of the compressor 2 is provided with an inlet guide vane (IGV) 3A for adjusting an intake air amount. The opening degree of the IGV 3A is configured to be adjustable by an actuator 3B (inlet guide vane control device).

The combustor 4 is configured to be supplied with fuel from a fuel supply source 11 via a fuel supply line 12. The fuel supply line 12 is provided with a fuel control valve 13 (fuel flow control device) for regulating the flow rate (fuel supply amount) of the fuel supplied to the combustor 4, and a pilot ratio control part 14 for adjusting the pilot ratio which is the ratio of a fuel supply amount to a pilot nozzle (not shown) to a fuel supply amount to the combustor 4 (for example, a control valve for controlling fuel supply amounts to the pilot nozzle (not shown) and a main nozzle (not shown)). The fuel control valve 13 and the pilot ratio control part 14, and the actuator 3B are electrically connected to a controller 15. The controller 15 determines a set value for controlling the fuel supply amount to the combustor 4 by the fuel control valve 13, through an operation described later. Thus, the controller 15 constitutes a fuel flow determination device for determining the set value of the fuel supply amount to the combustor 4.

Figure 2:
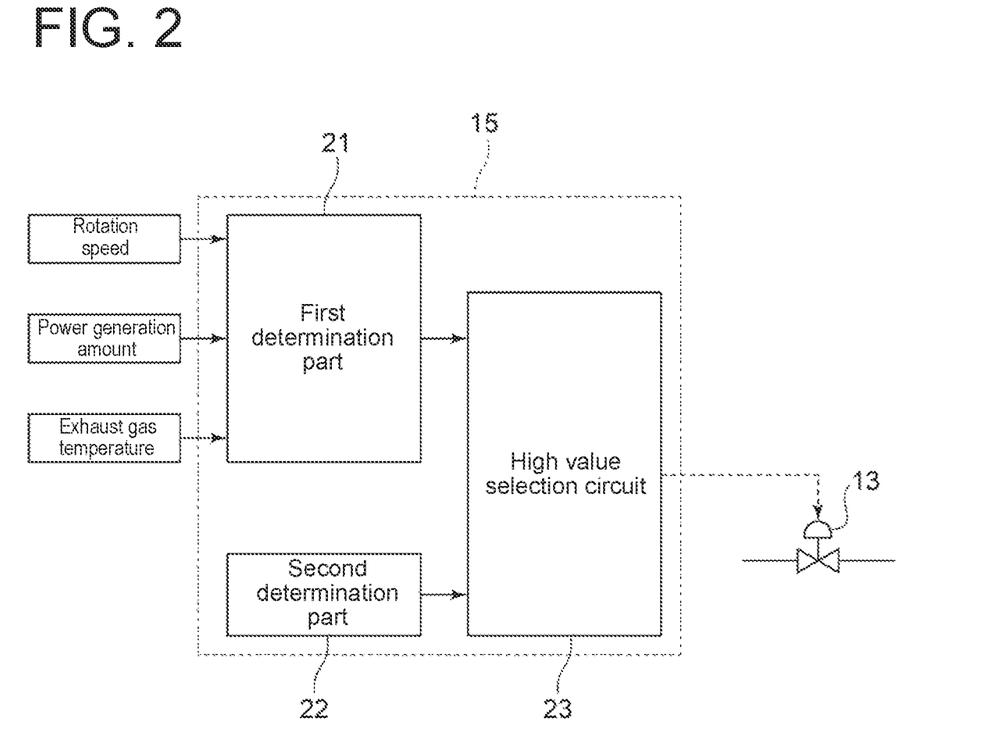
FIG. 2 is a block diagram showing the configuration of a controller for the gas turbine system according to an embodiment of the present disclosure.

As shown in FIG. 2, the controller 15 serving as the fuel flow determination device includes, based on operating conditions of the gas turbine 1 (see FIG. 1) and the motor generator 7 (see FIG. 1) in a normal operation mode described later: a first determination part 21 for determining a first set value which is a set value determined based on at least the rotation speed of the gas turbine 1; a second determination part 22 for determining a second set value which is a lower limit value of the fuel supply amount in a reverse power operation mode described later; and a high value selection circuit 23 electrically connected to each of the first determination part 21, the second determination part 22, and the fuel control valve 13 and configured to select, as the set value, one of the first set value or the second set value which is an option of the set value. The first determination part 21 is configured to receive at least data on the rotation speed of the gas turbine 1 from the gas turbine 1. The first determination part 21 may be configured to further receive data on, for example, the amount of power generated by the motor generator 7, the temperature of the exhaust gas discharged from the gas turbine 1, etc. Further, the lower limit value of the fuel supply amount in the reverse power operation mode determined by the second determination part 22 is a value provided in order to prevent misfire of the combustor 4 in the present embodiment, but the lower limit value does not necessarily have to be a minimum value in a range capable of preventing the misfire, may be a value set with some margin, or may be a value which is set in order to safely operate the gas turbine system 10 in the reverse power operation mode.

The controller 15 includes, for example, a Central Processing Unit (CPU), a Random Access Memory (RAM), a Read Only Memory (ROM), a computer-readable storage medium, and the like. Then, a series of processes for realizing various functions is stored in the storage medium or the like in the form of a program, as an example. The CPU reads the program out to the RAM or the like and executes processing/calculation of information, thereby realizing the various functions. A configuration where the program is installed in the ROM or another storage medium in advance, a configuration where the program is provided in a state of being stored in the computer-readable storage medium, a configuration where the program is distributed via a wired or wireless communication means, or the like may be applied. The computer-readable storage medium is a magnetic disk, a magneto-optical disk, a CD-ROM, a DVD-ROM, a semiconductor memory, or the like.

<Operation of Gas Turbine System According to Embodiment of Present Disclosure>

Next, an operation of the gas turbine system 10 according to an embodiment of the present disclosure will be described. The gas turbine system 10 of FIG. 1 can operate by appropriately switching between the normal operation mode which is an operation mode where the motor generator 7 is driven by the turbine 6, and the reverse power operation mode which is an operation mode where the motor generator 7 provides rotational power to the gas turbine 1 by electric power supplied from outside the gas turbine 1.

In the normal operation mode, compressed air is supplied from the compressor 2 to the combustor 4, and fuel is supplied from the fuel supply source 11 to the combustor 4 via the fuel supply line 12, thereby burning the fuel to generate a combustion gas. The combustion gas is supplied to the turbine 6 to drive, that is, to rotate the turbine 6, the rotation of the turbine 6 is transmitted to the motor generator 7 via the rotational shaft 5, and the motor generator 7 is driven as a generator. The electric power generated by the motor generator 7 is supplied to the power system 8.

On the other hand, in the reverse power operation mode, electric power is supplied to the motor generator 7 from the power system 8 outside the gas turbine 1, whereby the motor generator 7 is driven as the motor. The rotational power generated by the motor generator 7 is provided to the gas turbine 1 to assist the operation of the gas turbine 1. Therefore, the reverse power operation mode generally consumes less fuel than the normal operation mode.

<Control Method for Gas Turbine System According to Embodiment of Present Disclosure>

Figure 3:
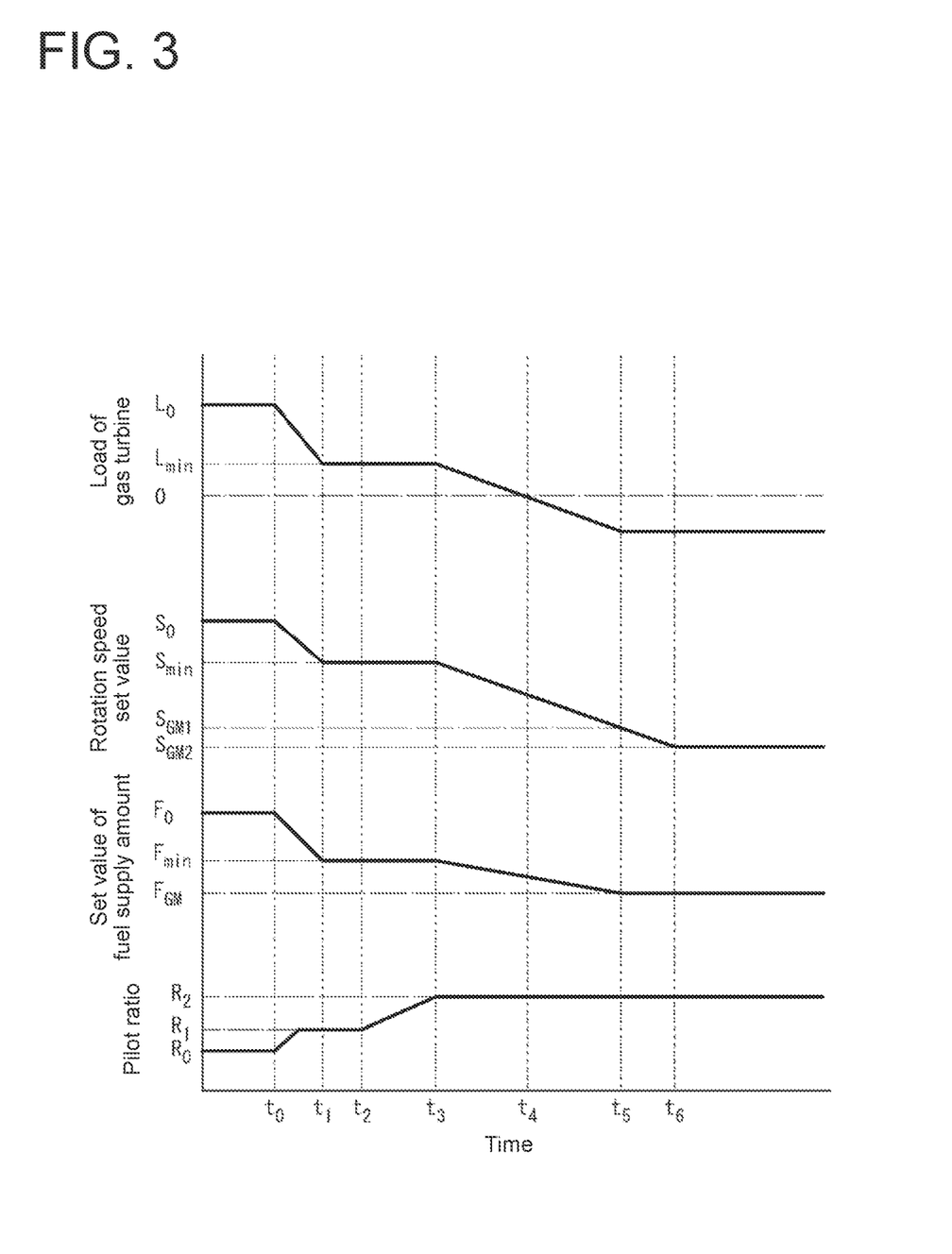
FIG. 3 is a timing chart showing temporal changes of various items when the gas turbine system transitions from a normal operation mode to a reverse power operation mode according to an embodiment of the present disclosure.

Next, a control method for the gas turbine system 10, particularly a method for controlling the fuel supply amount to the combustor 4, will be described with reference to FIGS. 1 and 2 and a timing chart of FIG. 3. The timing chart of FIG. 3 shows temporal changes of various items when the gas turbine system 10 transitions from the normal operation mode to the reverse power operation mode. Until time to, the gas turbine system 10 operates at a prescribed load L in the normal operation mode. At the time to, an operator of the gas turbine system 10 starts a preparation to start switching to the reverse power operation mode at time tz described later.

In a part of a process for transition into the reverse power operation mode of the present embodiment, a rotation speed set value of the gas turbine 1 is decreased, and a set value as a parameter, which is determined based on the actual rotation speed and the rotation speed set value, is decreased. In a general normal operation mode, if the gas turbine system 10 supplies electric power to the external power system 8, the fuel supply amount is controlled so that the rotational speed set value does not greatly differ from the rated frequency of the power system 8. In the gas turbine system 10 of the present embodiment, when connected to the power system 8, the fuel supply amount is decreased by taking advantage of the fact that the actual rotation speed is maintained at the value of the frequency of the power system 8 (or within substantially the same range) even if the rotation speed set value is lowered.

Before start switching to the reverse power operation mode, the rotation speed set value is gradually lowered from a predetermined value $S_0$ in the normal operation mode and the set value of the fuel supply amount transmitted from the first determination part 21 to the high value selection circuit 23 is decreased. As the rotation speed set value decreases, a difference which is subtraction of the rotation speed set value from the actual rotation speed (which depends on the frequency of the power system 8) increases, and the first set value determined by the first determination part 21 decreases.

The high value selection circuit 23 selects the larger of the first set value transmitted from first determination part 21 and the second set value transmitted from second determination part 22. Herein, the first set value is larger than the second set value until the fuel supply amount reaches the lower limit value in the reverse power operation mode. Therefore, in a preparation stage for transition into the reverse power operation mode, the high value selection circuit 23 selects the first set value as the set value of the fuel supply amount. By decreasing the rotation speed set value from the rotation speed set value $S_0$ toward a rotation speed set value $S_{min}$, the set value of the fuel supply amount decreases from an initial set value $F_0$ toward a set value $F_{min}$ corresponding to the minimum supply amount in the normal operation mode. The controller 15 controls the fuel control valve 13 based on the set value of the fuel supply amount which is a parameter used to control the fuel supply amount, thereby decreasing the opening degree of the fuel control valve 13 to respond to the decrease in the set value of the fuel supply amount. As a result, the load of the gas turbine system 10 decreases from the initial load $L_0$ to the minimum load $L_{min}$ in the normal operation mode.

Further, at the time to, the controller 15 controls the pilot ratio control part 14, thereby starting increasing the pilot ratio from an initial pilot ratio $R_0$. Consequently, even if the fuel supply amount to the combustor 4 decreases, a state is possible in which the combustor 4 is more unlikely to misfire. Further, at the time $t_0$, the controller 15 may control the actuator 3B, thereby adjusting the opening degree of the IGV 3A to such an opening degree at which the combustor 4 is less likely to misfire.

At time $t_1$, the load of the gas turbine system 10 becomes a minimum load $L_{min}$ in the normal operation mode (that is, the fuel supply amount to the combustor 4 becomes the minimum supply amount $F_{min}$ the normal operation mode). Shortly before reaching the time $t_1$, the pilot ratio is increased to the constant value $R_1$. Such operating conditions are maintained until a predetermined time elapses from the time $t_1$, that is, until the time $t_2$.

At the time $t_2$, for example, the operator of the gas turbine system 10 presses an operation mode switch button to start switching from the normal operation mode to the reverse power operation mode. The controller 15 controls the pilot ratio control part 14, thereby starting increasing the pilot ratio. At time $t_3$, the controller 15 stops increasing the pilot ratio, and after the time $t_3$, the pilot ratio is maintained at $R_2$ which is greater than $R_1$. Further, at the time $t_3$, the controller 15 may control the actuator 3B, thereby controlling the opening degree of the IGV 3A to such an opening degree suitable for the reverse power operation mode. As described above, when the operation mode switch button is pressed, the controller 15 performs control to establish the condition for transition into the reverse power operation mode, such as the pilot ratio.

The controller 15 further decreases the rotation speed set value from $S_{min}$ from the time $t_3$ at which the condition for transition into the reverse power operation mode is established. Since the difference from the actual rotation speed (which depends on the frequency of the power system 8) further increases as the rotation speed set value decreases, the set value of the fuel supply amount further decreases. The controller 15 controls the fuel control valve 13 based on the set value of the fuel supply amount which is the parameter used to control the fuel supply amount, thereby decreasing the opening degree of the fuel control valve 13 to respond to the decrease in the set value of the fuel supply amount. As a result, the load of the gas turbine also further decreases from the minimum load $L_{min}$ in the normal operation mode.

Although the load of the gas turbine system 10 becomes zero at time $t_4$, the fuel supply amount to the combustor 4 continues to decrease by continuously decreasing the rotation speed set value.

At time $t_5$, if the rotation speed set value decreases to $S_{GM1}$, the first set value determined by the first determination part 21 and the second set value determined by the second determination part 22 become the same value. Then, the high value selection circuit 23 further lowers the rotation speed set value, whereby the second set value becomes larger than the first set value and the high value selection circuit 23 selects a second set value $F_{GM}$ determined by the second determination part. In the present embodiment, considering a fluctuation in frequency of the external power system 8, the rotation speed set value is set to $S_{GM2}$ which is a value lower than $S_{GM1}$, at time $t_5$ after the time $t_5$. If the frequency of the external power system 8 fluctuates and becomes slightly lower than the rated frequency, a difference between the rotation speed of the gas turbine 1 (which depends on the frequency of the power system 8) and the rotation speed set value $S_{GM2}$ also slightly decreases, and the value of the first set value increases and varies. However, if the decreasing fluctuation in frequency of the power system 8 is within a predetermined amount range, the second set value is still larger than the first set value. Since the high value selection circuit 23 selects the second selection value, the lower limit value of the fuel supply amount in the reverse power operation mode is maintained. As a result, it is possible to suppress an excessive increase in fuel supply amount in the gas turbine system 10 due to the fluctuation in frequency of the power system 8. Herein, since the difference between the rotation speed set value $S_{GM1}$ and the rotation speed set value $S_{GM2}$ is determined in consideration of the fluctuation range of the frequency of the power system, it is possible to appropriately maintain the fuel supply amount in the reverse power operation mode in the state of the lower limit value (second set value $F_{GM}$).

Thus, in the gas turbine system 10 of the present disclosure, it is possible to appropriately control the flow rate of the fuel supplied to the combustor 4 of the gas turbine 1 in the reverse power operation mode.

<Modified Example of Control Method for Gas Turbine System According to Embodiment of Present Disclosure>

In the present embodiment, the second set value $F_{GM}$ is the predetermined constant value. However, the present disclosure is not limited to this form. For example, the second set value may automatically vary according to an intake air temperature of the gas turbine 1 or the ambient pressure. Further, the second set value $F_{GM}$ may be a parameter that automatically or manually varies according to the state of a fuel component (such as calorie content per unit amount). However, if the second set value $F_{GM}$ is the constant value, the flow rate of the fuel supplied to the combustor 4 of the gas turbine 1 is controlled based on the constant set value in the reverse power operation mode, making it possible to simplify the control of the fuel flow rate in the reverse power operation mode.

In the present embodiment, the second determination part 22 and the high value selection circuit 23 exist in the controller 15 in both the normal operation mode and the reverse power operation mode. However, the present disclosure is not limited to this form. It may be configured such that the second determination part 22 and the high value selection circuit 23 are disabled as control processing by the controller 15 in the normal operation mode and are enabled as control processing when switching to the reverse power operation mode is started.

In the present embodiment, it is described that in the process of switching to the reverse power operation mode (the time $t_5$ in the example of FIG. 3), the first determination part 21 can be configured to set the rotation speed set value such that the first set value is smaller than the second set value. If the second determination part 22 and the high value selection circuit 23 exist also in the normal operation mode, the first determination part 21 is configured to set the rotation speed set value such that the first set value is larger than the second set value in the normal operation mode, allowing the high value selection circuit 23 to always select the first set value as the set value in the normal operation mode. The second set value in the normal operation mode and the second set value in the reverse power operation mode do not have to be the same, but the value may be switched according to switching of the operation modes. That is, the second set value in the normal operation mode may be set to be larger than the second set value in the reverse power operation mode, or vice versa. Whereby, it is possible to appropriately control the flow rate of the fuel supplied to the combustor 4 of the gas turbine 1 also in the normal operation mode.

In the present embodiment, the configuration is described in which the set value of the fuel supply amount is continuously decreased to the second set value (lower limit value) by continuously decreasing the first set value in transition into the reverse power operation mode. However, the configuration may be adopted in which the set value of the fuel supply amount is discontinuously decreased to the second set value (lower limit value) in transition into the reverse power operation mode. Said configuration is also realized by, for example, causing the high value selection circuit 23 to discontinuously switch the input signal to itself from the first set value determined by the first determination part 21 to the second set value determined by the second determination part 22, in transition into the reverse power operation mode. However, by continuously decreasing the set value of the fuel supply amount to the second set value (lower limit value) as in the present embodiment, the risk of misfire can further be reduced.

In the present embodiment, electric power is supplied from the power system 8 to the motor generator 7 as electric power supplied from outside the gas turbine 1 in the reverse power operation mode. However, the present disclosure is not limited to this form. The motor generator 7 may be supplied with electric power that is excessive in another plant or the like.

The contents described in the above embodiments would be understood as follows, for instance.

[1] A gas turbine system according to one aspect is a gas turbine system (10) that includes: a gas turbine (1) which includes a compressor (2) for producing compressed air, a combustor (4) for burning fuel with the compressed air, and a turbine (6) driven by a combustion gas generated by burning the fuel in the combustor (4); a motor generator (7) drivable by the turbine (6) and capable of providing rotational power to the gas turbine (1) by electric power supplied from outside the gas turbine (1); a fuel flow determination device (controller 15) for determining a set value of a parameter used to control a flow rate of the fuel supplied to the combustor (4); and a fuel flow control device (fuel control valve 13) for controlling the flow rate of the fuel supplied to the combustor (4), based on the set value. The fuel flow determination device (15) determines the set value such that the flow rate of the fuel is a lower limit value in a reverse power operation mode, in the reverse power operation mode which is an operation mode where the motor generator (7) provides the rotational power to the gas turbine (1).

With the gas turbine system of the present disclosure, it is possible to appropriately control the flow rate of the fuel supplied to the combustor of the gas turbine in the reverse power operation mode.

[2] A gas turbine system according to another aspect is the gas turbine system of [1], wherein the fuel flow determination device (15) includes: a first determination part (21) for determining a first set value as an option of the set value determined based on at least a rotation speed of the gas turbine (1); and a second determination part (22) for determining a second set value as the lower limit value in the reverse power operation mode, and wherein the first set value and the second set value are compared, and the larger of the first set value and the second set value is determined as the set value, in the reverse power operation mode.

With such configuration, it is possible to appropriately control the flow rate of the fuel supplied to the combustor of the gas turbine in the reverse power operation mode.

[3] A gas turbine system according to still another aspect is the gas turbine system of [2], wherein the first determination part (21) decreases the set value of the rotation speed with respect to a frequency of the electric power supplied from the outside, if the flow rate of the fuel is decreased to enter the reverse power operation mode.

With such configuration, it is possible to appropriately control the flow rate of the fuel supplied to the combustor of the gas turbine in the reverse power operation mode.

[4] A gas turbine system according to yet another aspect is the gas turbine system of [2] or [3], wherein the first determination part (21) determines the set value of the rotation speed in the reverse power operation mode such that a difference obtained by subtracting the set value of the rotation speed from the rotation speed of the gas turbine (1) is greater in the reverse power operation mode than the difference in an operation mode where the motor generator (7) is driven by the turbine (6).

With such configuration, since the first set value determined based on at least the rotation speed of the gas turbine is determined as the set value in the normal operation mode, it is possible to appropriately control the flow rate of the fuel supplied to the combustor of the gas turbine in the normal operation mode.

[5] A gas turbine system according to yet another aspect is the gas turbine system of any of [2] to [4], wherein the first determination part (21) determines the first set value such that the first set value is lower than the second set value which is the lower limit value, if an increasing fluctuation in the flow rate of the fuel from the second set value is suppressed, in the reverse power operation mode.

With such configuration, it is possible to appropriately control the flow rate of the fuel supplied to the combustor of the gas turbine in the reverse power operation mode.

[6] A control method for a gas turbine system according to one aspect is a control method for a gas turbine system (10) that includes: a gas turbine (1) which includes a compressor (2) for producing compressed air, a combustor (4) for burning fuel with the compressed air, and a turbine (6) driven by a combustion gas generated by burning the fuel in the combustor (4), a motor generator (7) drivable by the turbine (6) and capable of providing rotational power to the gas turbine (1) by electric power supplied from outside the gas turbine (1); and a fuel flow control device (fuel control valve 13) for controlling a set value of a parameter used to control a flow rate of the fuel supplied to the combustor (4), the control method for the gas turbine system (10), including: determining the set value such that the flow rate of the fuel is not less than a lower limit value in a reverse power operation mode, in the reverse power operation mode which is an operation mode where the motor generator (7) provides the rotational power to the gas turbine (1).

With the control method for the gas turbine system of the present disclosure, it is possible to appropriately control the flow rate of the fuel supplied to the combustor of the gas turbine in the reverse power operation mode.

REFERENCE SIGNS LIST

1 Gas turbine
2 Compressor
4 Combustor
6 Turbine
7 Motor generator
10 Gas turbine system
13 Fuel control valve (fuel flow control device)
15 Controller (fuel flow determination device)
21 First determination part
22 Second determination part

The invention claimed is:

1. A gas turbine system, comprising:
a gas turbine which includes a compressor for producing compressed air, a combustor for burning fuel with the compressed air, and a turbine driven by a combustion gas generated by burning the fuel in the combustor;
a motor generator drivable by the turbine and capable of providing rotational power to the gas turbine by electric power supplied from outside the gas turbine;
a fuel flow determination device for determining a set value of a parameter used to control a flow rate of the fuel supplied to the combustor; and
a fuel flow control device for controlling the flow rate of the fuel supplied to the combustor, based on the set value,
wherein the fuel flow determination device is configured to switch the gas turbine system from a normal operation mode which is an operation mode where the motor generator is driven by the gas turbine to a reverse power operation mode which is an operation mode where the motor generator provides the rotational power to the gas turbine,
wherein the fuel flow determination device gradually reduces a rotation speed set value of the gas turbine throughout a switching of the gas turbine system from the normal operation mode to the reverse power operation mode, and
wherein after switching from the normal operation mode to the reverse power operation mode, the fuel flow determination device determines the set value such that the flow rate of the fuel is a lower limit value in the reverse power operation mode.

2. The gas turbine system according to claim 1,
wherein the fuel flow determination device includes:
a first determination part for determining a first set value, as an option of the set value, determined based on at least a rotation speed of the gas turbine; and
a second determination part for determining a second set value as the lower limit value in the reverse power operation mode, and
wherein the first set value and the second set value are compared, and a larger of the first set value and the second set value is determined as the set value, in the reverse power operation mode.

3. The gas turbine system according to claim 2,
wherein the first determination part decreases the set value of the rotation speed with respect to a frequency of the electric power supplied from the outside, when the flow rate of the fuel is decreased to enter the reverse power operation mode.

4. The gas turbine system according to claim 2,
wherein the first determination part determines the set value of the rotation speed in the reverse power operation mode such that a difference obtained by subtracting the set value of the rotation speed from the rotation speed of the gas turbine is greater in the reverse power operation mode than the difference in the normal operation mode.

5. The gas turbine system according to claim 2,
wherein in the reverse power operation mode, the first determination part determines the first set value such that the first set value is lower than the second set value when an increasing fluctuation in the flow rate of the fuel from the second set value is suppressed.

6. A control method for a gas turbine system that includes:
a gas turbine which includes a compressor for producing compressed air, a combustor for burning fuel with the compressed air, and a turbine driven by a combustion gas generated by burning the fuel in the combustor;
a motor generator drivable by the turbine and capable of providing rotational power to the gas turbine by electric power supplied from outside the gas turbine; and
a fuel flow control device for controlling a set value of a parameter used to control a flow rate of the fuel supplied to the combustor,
the control method for the gas turbine system comprising:
switching the gas turbine system from a normal operation mode which is an operation mode where the motor generator is driven by the gas turbine to a reverse power operation mode which is an operation mode where the motor generator provides the rotational power to the gas turbine;
gradually reducing a rotation speed set value of the gas turbine throughout the switching of the gas turbine system from the normal operation mode to the reverse power operation mode; and
after the switching of the gas turbine system from the normal operation mode to the reverse power operation mode, determining the set value such that the flow rate of the fuel is not less than a lower limit value in the reverse power operation mode.

7. A gas turbine system, comprising:
a gas turbine which includes a compressor for producing compressed air, a combustor for burning fuel with the compressed air, and a turbine driven by a combustion gas generated by burning the fuel in the combustor;
a motor generator drivable by the turbine and capable of providing rotational power to the gas turbine by electric power supplied from outside the gas turbine;
a fuel flow determination device for determining a set value of a parameter used to control a flow rate of the fuel supplied to the combustor; and
a fuel flow control device for controlling the flow rate of the fuel supplied to the combustor, based on the set value,
wherein the fuel flow determination device is configured to switch the gas turbine system from a normal operation mode which is an operation mode where the motor generator is driven by the gas turbine to a reverse power operation mode which is an operation mode where the motor generator provides the rotational power to the gas turbine,
wherein, prior to a start of switching to the reverse power mode, the fuel flow determination device controls a rotation speed set value of the gas turbine from a predetermined set value in the normal operation mode to a lower value and decreases the flow rate of the fuel from an initial set value in the normal operation mode to a minimum value in the normal operation mode, and wherein after switching from the normal operation mode to the reverse power operation mode, the fuel flow determination device determines the set value such that the flow rate of the fuel is a lower limit value in the reverse power operation mode.

* * * * *